US012126128B2

(12) United States Patent
Guillanton et al.

(10) Patent No.: US 12,126,128 B2
(45) Date of Patent: Oct. 22, 2024

(54) INSULATED CONNECTION SYSTEM FOR BUSBARS

(71) Applicant: Aptiv Technologies Limited, St. Michael (BB)

(72) Inventors: Mélanie Guillanton, Epernon (FR); Jean Fabre, Chartres (FR)

(73) Assignee: APTIV TECHNOLOGIES AG, Schaffhausen (CH)

( * ) Notice: Subject to any disclaimer, the term of this patent is extended or adjusted under 35 U.S.C. 154(b) by 306 days.

(21) Appl. No.: 17/856,152

(22) Filed: Jul. 1, 2022

(65) Prior Publication Data
US 2023/0009132 A1  Jan. 12, 2023

(30) Foreign Application Priority Data

Jul. 7, 2021  (EP) ..................................... 21184286

(51) Int. Cl.
| | |
|---|---|
| *H01R 25/14* | (2006.01) |
| *H01M 50/502* | (2021.01) |
| *H01R 13/516* | (2006.01) |
| *H01R 13/639* | (2006.01) |
| *H01R 13/641* | (2006.01) |

(52) U.S. Cl.
CPC .......... *H01R 25/14* (2013.01); *H01M 50/502* (2021.01); *H01R 13/516* (2013.01); *H01R 13/639* (2013.01); *H01R 13/641* (2013.01); *H01M 2220/20* (2013.01)

(58) Field of Classification Search
None
See application file for complete search history.

(56) References Cited

U.S. PATENT DOCUMENTS

| | | |
|---|---|---|
| 8,625,257 B2 | 1/2014 | Schalk et al. |
| 9,780,478 B2 | 10/2017 | Kamei |
| 10,910,800 B1 * | 2/2021 | Baseri ..................... H02G 5/007 |
| | (Continued) | |

FOREIGN PATENT DOCUMENTS

| | | |
|---|---|---|
| CN | 203219188 U | 9/2013 |
| CN | 203481633 U | 3/2014 |
| | (Continued) | |

OTHER PUBLICATIONS

Extended European Search Report for EP Application No. 21184286.9 mailed on Dec. 23, 2021.

*Primary Examiner* — Tho D Ta
(74) *Attorney, Agent, or Firm* — Billion & Armitage

(57) ABSTRACT

An insulated connection system for connecting a first busbar and a second busbar to at least a first connector and a second connector. The second busbar including a bar orifice to connect the first connector to the first busbar. The insulated connection system including an electrically insulating casing defining: a first recess portion for accommodating a first connecting portion of the first busbar, a second recess portion for accommodating a second connecting portion of the second busbar, and a sleeve portion for accommodating a portion of the second busbar provided with the bar orifice. The insulated connection system further including a busbar positioning assurance (BPA) member of electrically insulating material configured to accommodate a portion of the first connector and to be received in the connector passage and the bar orifice.

14 Claims, 3 Drawing Sheets

(56) References Cited

U.S. PATENT DOCUMENTS

| | | | |
|---|---|---|---|
| 10,992,069 B2 * | 4/2021 | Kudo | ................. H01R 4/30 |
| 2017/0222351 A1 * | 8/2017 | Kamei | ............... H01R 13/44 |
| 2018/0190964 A1 | 7/2018 | Caumont | |
| 2020/0091489 A1 | 3/2020 | Zeng et al. | |

FOREIGN PATENT DOCUMENTS

| | | | | |
|---|---|---|---|---|
| CN | 204315865 U | | 5/2015 | |
| CN | 109698307 A | | 4/2019 | |
| DE | 102005060586 B4 | | 2/2008 | |
| DE | 202013003925 U1 | | 6/2013 | |
| DE | 102014221795 A1 | | 4/2016 | |
| DE | 102016201328 A1 | | 8/2017 | |
| DE | 102016212324 A1 | | 1/2018 | |
| DE | 202019106641 U1 | * | 2/2020 | ......... B60R 16/0215 |
| EP | 1519396 A3 | | 5/2006 | |
| EP | 2315313 B1 | | 2/2012 | |
| EP | 2309611 B1 | | 5/2019 | |
| FR | 3020902 A3 | | 11/2015 | |
| FR | 3029361 B1 | | 3/2018 | |
| WO | 2018220094 A1 | | 12/2018 | |
| WO | 2020012914 A1 | | 1/2020 | |
| WO | WO-2020121834 A1 | * | 6/2020 | ............... H01R 9/24 |

\* cited by examiner

INSULATED CONNECTION SYSTEM FOR BUSBARS

CROSS-REFERENCE TO RELATED APPLICATION

This application claims benefit of priority to European Patent Application No. 21184286.9 filed on Jul. 7, 2021, the entire disclosure of which is hereby incorporated by reference.

TECHNICAL FIELD OF THE INVENTION

The present disclosure relates to the field of electrical connections, for example to busbars configured to transmit electrical power, for example from and/or toward a secondary battery or battery modules. Such a system can be used, for example, in a vehicle battery.

BACKGROUND

Electrical power transmission, for example from a power source to a motor or to a battery, generally involves electrical connections with electrical insulation to protect the persons using, installing, or servicing the corresponding electrical system.

For example, German Patent No. 102016201328 discloses a line connecting system providing electrical insulation. However, the line connection system is bulky and may not be mounted into tight spaces, for example inside a battery.

There is thus a need to improve the situation. More precisely, the present disclosure may provide a space-saving insulated connection system providing an electrical insulation and simplifying assembly in a tight space.

SUMMARY

The present disclosure aims at providing a connection solution for limiting the heating of the power terminals through which high intensity currents are transmitted.

The present disclosure concerns an insulated connection system for connecting at least a first busbar and a second busbar to at least a first connector and a second connector respectively, the second busbar including a bar orifice to connect the first connector to the first busbar through the second busbar, the insulated connection system having: an electrically insulating casing defining: a first recess portion for accommodating a first connecting portion of the first busbar, the first recess portion defining a first connection orifice for connecting the first connecting portion to the first connector, a second recess portion for accommodating a second connecting portion of the second busbar; the second recess portion defining a second connection orifice for connecting the second connecting portion to the second connector, a sleeve portion for accommodating a portion of the second busbar provided with the bar orifice, the sleeve portion defining a connector passage configured to allow the passage of the first connector through the sleeve portion, a busbar positioning assurance (BPA) member having a hollow body of electrically insulating material configured to accommodate a portion of the first connector, and being further configured to be received in the connector passage and the bar orifice when the bar orifice is aligned with the connector passage.

Consequently, the BPA member may allow to align or center the bar orifice with the connector passage in a closed position of the BPA member, i.e., when the BPA member is received in the connector passage. Consequently, the second busbar may be correctly positioned in the electrically insulating casing and/or the second connector may be introduced in a correct position and without contacting the second busbar. For example, the first recess portion and/or the first connection orifice may be aligned with the connector passage.

Such an insulated connection system may be valuable to connect busbars to other electrical elements such as connectors in a tight space and with a simplified assembling method. In addition, the connecting portions of the busbars and/or of the connectors may be insulated by the electrically insulating casing, which may provide a high level of electrical insulation limiting short circuits or electrical incidents.

Advantageously, the BPA member is received in the connector passage in a closed position and/or the insulated connection system further includes an anchor unit configured to anchor the BPA member to the electrically insulating casing at least in an open position in which the BPA member is not received in the connector passage or is not located in the bar orifice. For example, the anchor unit may be located partly in the connector passage and partly on the BPA member. Consequently, the BPA member may be provided as a single assembly with the electrically insulating casing, thus simplifying supply chain and assembly of the present insulated connection system.

Advantageously, the anchor unit includes at least one edge provided on one of the connector passage and the BPA member and at least one hook provided on the other of the connector passage and the BPA member, the edge and the hook being engaged at least in the open position of the BPA member. Such an anchor unit is inexpensive to manufacture and may allow a reliable anchoring of the BPA member to the electrically insulating casing.

Advantageously, the insulated connection system includes a locking unit configured to lock the BPA member to the electrically insulating casing when the BPA member is received in the connector passage, i.e., in the closed position. For example, the locking unit may be located partly in the connector passage and partly on the BPA member. Such a locking unit may contribute to simplify the assembly of the insulated connection system by avoiding any disconnection or removal between the first and second busbars and the electrically insulating casing.

Advantageously, the locking unit includes at least one edge provided on one of the connector passage and the BPA member and at least one groove provided on the other of the connector passage and the BPA member, the edge and the groove being engaged when the BPA member is received in the connector passage, i.e., in the closed position of the BPA member. Such a locking unit is inexpensive to manufacture and may allow a reliable locking of the BPA member to the electrically insulating casing.

Advantageously, the BPA member is configured to be in contact with the second busbar and the electrically insulating casing when the BPA member is received in the connector passage, i.e., in the closed position, which may thus contribute to a correct positioning of the second busbars in the electrically insulating casing. The BPA member may further accommodate part of the first connector and/or be in contact with the first connector.

Advantageously, the first connection orifice and the second connection orifice each define an orifice axis parallel to each other. Preferably, the orifice axes are offset to each other. This may allow a simple connection with parallel connectors and then may contribute to save space. For example, the orifice axes are symmetry axes of the connection orifices.

Advantageously, the first recess portion and the second recess portion each define a recess longitudinal axis parallel to each other. Preferably, the recess longitudinal axes are offset to each other. This may allow a simple arrangement of the busbars and an insulating casing easy to manufacture.

Advantageously, the orifice axes are perpendicular to the recess longitudinal axes. This may allow an electrically insulating casing with a simple shape and a space saving connection of the busbars with the connectors.

Advantageously, the connector passage is aligned with the orifice axis of the first connection orifice. Consequently, the connector passage may define a passage axis aligned with the orifice axis. This may allow to provide a space-saving insulated connection system easy to assemble.

Advantageously, the sleeve portion is defined by a portion of an outer wall and an inner wall of the electrically insulating casing. The inner wall may be arranged to face or contact an inner side of the second busbar and/or for separating and insulating the second busbar from the first busbar. The outer wall portion may be arranged to face or contact an outer side of the second busbar.

Advantageously, the connector passage includes an outer wall orifice defined in the portion of the outer wall and an inner wall orifice defined in the inner wall. For example, the outer wall orifice and/or the inner wall orifice may be aligned with the first connection orifice and/or the bar orifice.

Preferably, the BPA member is configured to be inserted at least in the outer wall orifice and optionally in the inner wall orifice in the closed position. This may contribute to a tight alignment and/or centering of the second busbar with regard to the electrically insulating casing.

Preferably, the insulated connection system further includes the first and second busbars and the first and second connectors, each of them being connected to the respective busbar.

Preferably, the two busbars are parallel to each other, the connectors are parallel to each other and preferably perpendicular to the busbars, in an assembled configuration. This further contributes to reducing a volume or a size of the insulated connection system.

The present disclosure further concerns a battery such as a secondary battery including the above insulated connection system. For example, the secondary battery may be integrated in a transportation system such as a vehicle.

The present disclosure further concerns a vehicle integrating the above battery or the above insulated connection system, for example in a battery and/or a charging circuit.

The present disclosure further concerns an insulated connection system for connecting at least a first busbar having a first connecting portion to a first connector and a second busbar having a second connecting portion to a second connector. The first connector may be introduced through the second busbar. The insulated connection system may electrically insulate the first busbar from the second busbar and the second busbar from the first connector.

For example, the insulated connection system includes an electrically insulating casing surrounding or accommodating at least the first connecting portion and the second connecting portion.

For example, the insulated connection system includes a Busbar Positioning Assurance (BPA) member or insert member that may be located between the first connector and the second busbar and/or between the first connector and the electrically insulating casing.

BRIEF DESCRIPTION OF THE DRAWINGS

The present invention is now described, by way of example with reference to the accompanying drawings, in which.

DETAILED DESCRIPTION

The present disclosure relates to an insulated connection system configured for any kind of electrical connection, for example within a vehicle and/or within a secondary battery. For example, the insulated connection system may be placed in a battery of a vehicle to establish an electrical connection between a charging interface and battery modules or a battery charging circuit.

Figure 1:
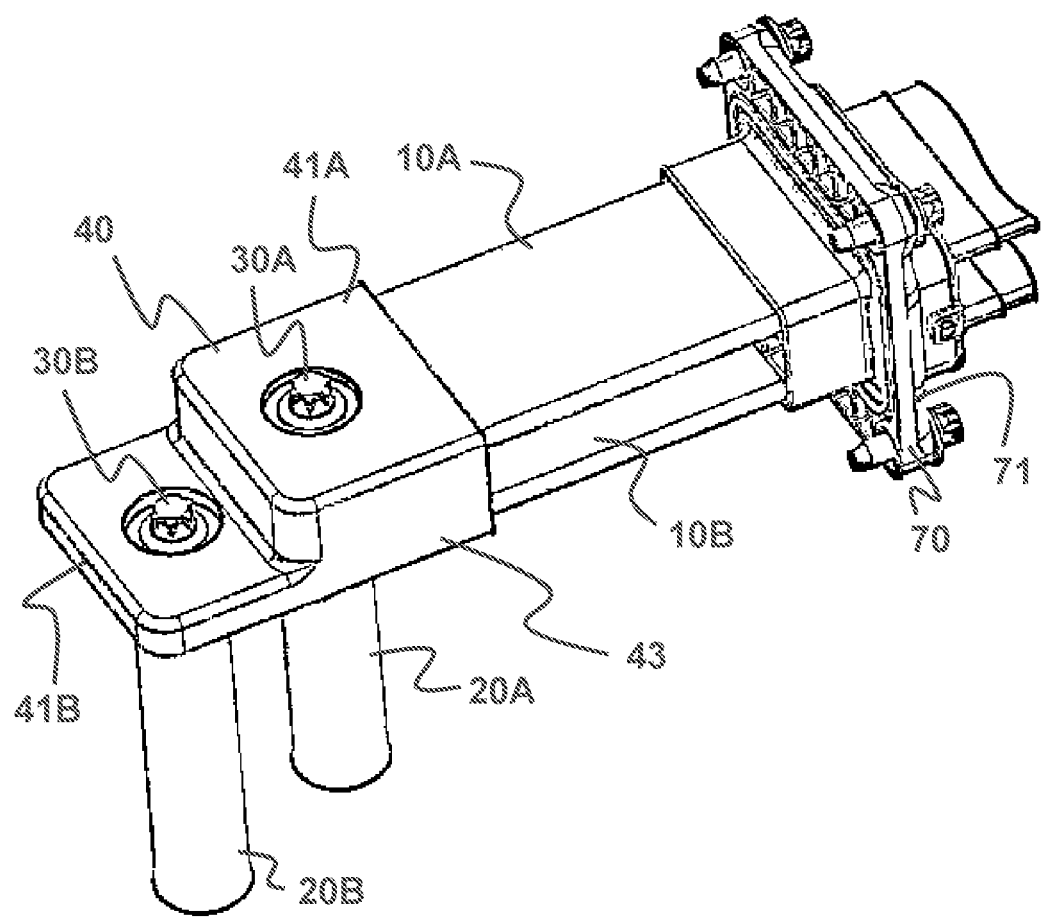
FIG. 1 shows an insulated connection system in an assembled form according to some embodiments.

FIG. 1 shows an insulated connection system having two busbars 10A, 10B connected to two connectors 20A, 20B in the form of studs and fixed thanks to screws 30A, 30B. The two connectors 20A, 20B may have a circular cross-sectional shape. The busbars 10A, 10B and the connectors 20A, 20B have an electrically insulating layer 60 on their surface (see FIG. 2), except for their respective connecting/extremity portions which are free of any electrically insulating layer to allow an electrical connection, for example showing bare metal.

Figure 2:
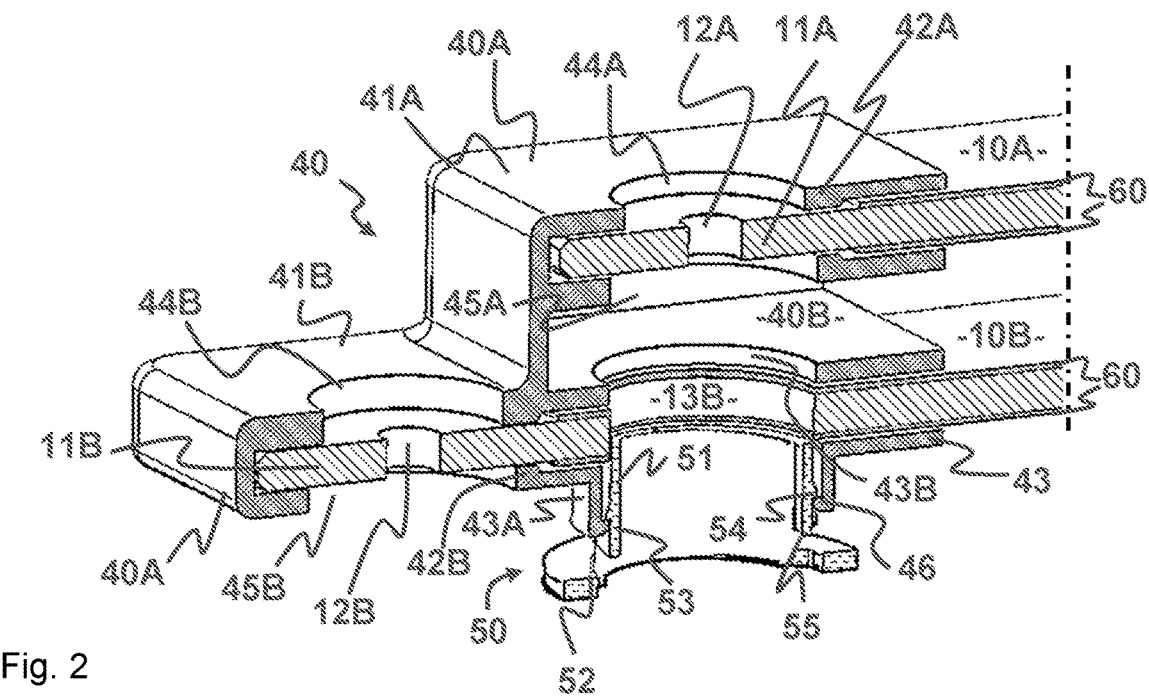
FIG. 2 shows an insulated connection system in an open position according to some embodiments.
Figure 3:
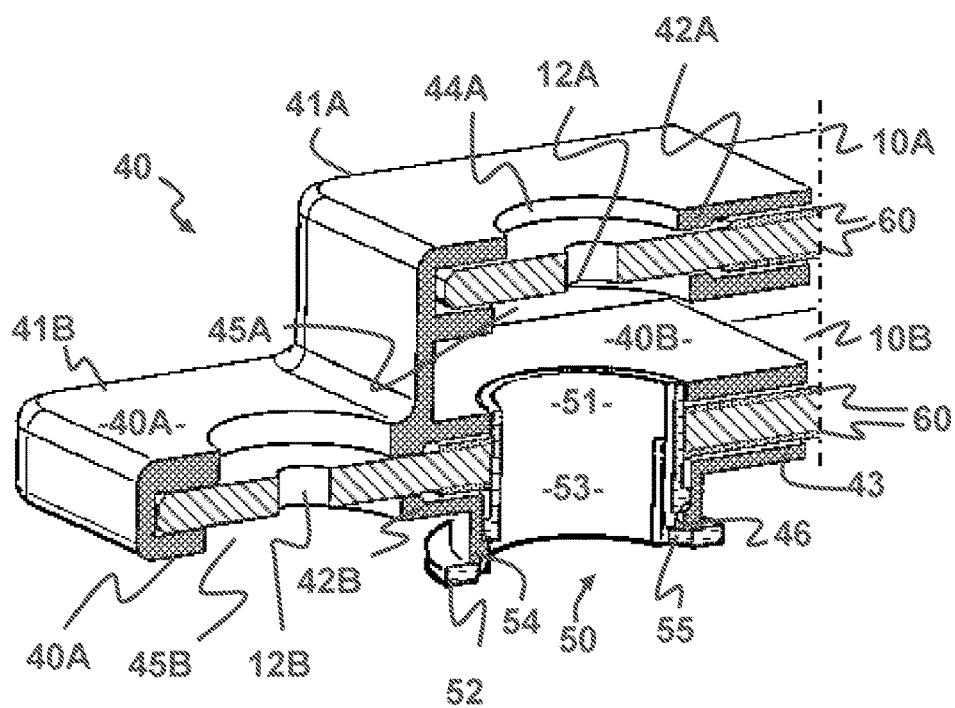
FIG. 3 shows an insulated connection system in a closed position during assembling according to some embodiments.

The electrically insulating layer 60 may form an overlay or over thickness visible in FIGS. 2 and 3. The electrically insulating layer 60 includes an electrically insulating substance or material, such as an insulating polymer or composite, for example polyamide such as Polyamide 12.

The connecting/extremity portions of the busbars and the connectors are covered by an electrically insulating casing 40 in an assembled configuration of the insulated connection system illustrated in FIG. 1. Further, a sealing interface 70 may be provided to seal the passage of the busbars 10A, 10B through a battery casing (not shown).

For example, the busbars may be connected to a charging interface of an electric or hybrid vehicle and the connectors may be connected to battery modules or to a charging circuit of a battery.

The busbars 10A, 10B may have a flat rectangular planar structure. However, the busbars 10A, 10B are not limited to a flat or rectangular cross-section and the connectors 20A, 20B are not limited to a circular cross-section. In contrast, the busbars and the connectors may have any geometry or cross-section configured to transport electrical power.

In the example of FIG. 1, the first busbar 10A and the second busbar 10B are parallel to each other, the first busbar 10A is on top of the second busbar 10B and may be shorter than the second busbar 10B. For example, the extremity of the second busbar 10B is located further from the extremity of the first busbar 10A with regard to the sealing interface 70 and the battery casing. Nonparallel busbars may also be contemplated, in accordance with the specific arrangement of the battery modules or charging circuit to be connected to the busbars.

The insulated connection system may be configured such that the first and second connectors 20A, 20B may be parallel to each other and perpendicular to the first and second busbars 10A, 10B in an assembled configuration. Such an arrangement may be optimal for space considerations. However, different angles and geometries may be contemplated by the skilled person in accordance with the specific arrangement of the battery modules or charging circuit to be connected to the busbars. For example, an angle between one or both busbars and the respective connector(s) may be different from 90°, for example 30°, 45°, 60°, 75° or 80° or any other value.

In any case, the recess portions may define recess longitudinal axes, the connection orifices may define orifice axes, such as symmetry axes, and the connector passage may define a connector passage axis, such as a symmetry axis. These axes may thus be arranged to allow the specific arrangement and connection of the connectors 20A, 20B with the busbars 10A, 10B. The orifice axes may be perpendicular to the recess longitudinal axes.

The sealing interface 70 may include a frame portion 71 enclosing the first busbar 10A and the second busbar 10B, a first seal (not shown) provided in between and around the first busbar 10A and the second busbar 10B and a second seal (not shown) provided on an inner face of the frame portion 71 so as to contact an outer surface of the battery casing (not shown). The frame portion 71 may be fixed to the battery casing through one or several screws or may be snap fitted or welded.

With reference to FIG. 2, the first busbar 10A includes a first connecting portion 11A without any electrically insulating layer 60. The first connecting portion 11A defines a first fixing through hole 12A. Similarly, the second busbar 10B includes a second connecting portion 11B without any electrically insulating layer. The second connecting portion 11B defines a second fixing through hole 12B. The connecting portions may be provided at the respective extremities of the first busbar 10A and the second busbar 10B.

The fixing through holes 12A, 12B are configured to receive parts of the screws 30A, 30B in order to connect and fasten the extremities of the connectors 20A, 20B to the connecting portions of the busbars 10A, 10B. The extremities of the connectors 20A, 20B are also devoid of any electrically insulating layer, to allow an electrical connection and may be provided with screwing holes, with or without an internal thread corresponding to the screws 30A, 30B.

Alternatively, the connectors 20A, 20B may be snap-fitted or welded to the busbars 10A, 10B, while screwing remains an easy and reliable fixing method in a tight space.

The second busbar 10B further defines a bar orifice 13B configured to accommodate at least part of the first connector 20A. The internal wall of the bar orifice 13B may be devoid of any electrically insulating layer and may have a diameter equal or greater than the outer diameter of the first connector 20A.

The electrically insulating casing 40 includes an outer wall 40A defining a first recess portion 41A intended to accommodate the first connecting portion 11A of the first busbar 10A and a second recess portion 41B intended to accommodate the second connecting portion 11B of the second busbar 10B. The outer wall 40A can extend right around the connecting portions 11A, 11B to define at least part of the electrically insulating casing 40.

The first connection orifice 45A and the second connection orifice 45B may each define an orifice axis parallel to each other. The first recess portion 41A and the second recess portion 41B may each define a recess longitudinal axis parallel to each other. The orifice axes may be perpendicular to the recess longitudinal axes.

Each of the recess portions 41A, 41B may be defined by at least three sections of the outer wall 40A, for example two parallel sections and one perpendicular section of the outer wall 40A, with one open section opposite the perpendicular section and allowing to introduce at least the connecting portion of the corresponding busbar 10A, 10B. Preferably, the recess portions 41A, 41B further include side sections of the outer wall 40A, in order to fully enclose the connecting portions of the first and second busbars 10A, 10B, as visible in FIG. 1.

Each of the open sections of the first recess portion 41A and the second recess portion 41B may be partially closed by a restriction 42A, 42B, that may define an internal abutment to abut an edge of the electrically insulating layer 60 of each of the first busbar 10A and the second busbar 10B. Consequently, the edge may be located substantially at a boundary between the connecting portions 11A, 11B and the main portion covered by the electrically insulating layer 60 of each of the busbars 10A, 10B.

The length between the restrictions 42A, 42B and the opposite perpendicular sections of the outer wall 40A may be substantially equal or shorter than the length of the corresponding connecting portions 11A, 11B of the first and second busbars 10A, 10B. The restrictions 42A, 42B may avoid the insertion of busbars fully covered with the electrically insulating layer 60, i.e., without any connecting portion.

Each of the recess portions 41A, 41B may include a screw orifice 44A, 44B configured to accommodate one of the screws 30A, 30B and a connection orifice 45A, 45B configured to accommodate the extremity of one of the connectors 20A, 20B, so as to allow the fixation and the electrical connection between the connecting portions 11A, 11B of the busbars 10A, 10B and the respective connectors 20A, 20B. The connection orifice and the screw orifice of each recess portion may be located opposite each other or perpendicular to each other. For example, the screw orifices 44A, 44B are each on a top surface of the electrically insulating casing 40, as illustrated in FIGS. 1-3.

The electrically insulating casing 40 may further include a sleeve portion 43 enclosing a portion of the second busbar 10B provided with the bar orifice 13B. This portion of the second busbar 10B may be substantially or totally covered with the electrically insulating layer 60, for example with the exception of an inner surface of the bar orifice 13B. The sleeve portion 43 may be defined at least by a portion of the outer wall 40A and possibly by an inner wall 40B intended to face or contact the second busbar 10B and connected to the outer wall 40A by side wall sections (not visible in FIGS. 2 and 3, see FIG. 1).

The inner wall 40B may be located between the second busbar 10B and the first recess portion 41A and/or between the second busbar 10B and the first connecting portion 11A of the first busbar 10A. The sleeve portion 43 has an outer wall orifice 43A on the portion of the outer wall 40A and inner wall orifice 43B on the inner wall 40B defining a connector passage.

The outer wall orifice 43A and the inner wall orifice 43B may have the same diameter or the inner wall orifice 43B may be smaller than the outer wall orifice 43A. The diameter of the outer wall orifice 43A and of the inner wall orifice 43B may be equal to or greater than a diameter of the first connector 20A. In addition, the outer wall orifice 43A and the inner wall orifice 43B may be aligned with the bar orifice 13B and/or with the first connection orifice 45A. The outer wall orifice 43A may have a predetermined length or thickness. The connector passage may allow the connection of the first connector 20A to the first busbar 10A through the second busbar 10B, while maintaining protection and insulation of the second busbar 10B.

The insulated connection system includes an insert member or Busbar Positioning Assurance (BPA) member 50 that may have a mushroom shape and be substantially hollow. The BPA member 50 may have a cylindrical portion 51 with an outer diameter corresponding substantially to or slightly smaller than the diameter of the bar orifice 13B, a head portion 52 larger than the cylindrical portion 51 and a mid-portion 53 located between the cylindrical portion 51 and the head portion 52.

The mid-portion 53 of the BPA member 50 may have one or several hooks 54 intended to interact with an edge 46 of the outer wall orifice 43A in an open position of the BPA member 50, visible in FIG. 2. Further, the mid portion 53 may further include one or several grooves 55 or insert orifices intended to interact with the edge 46 of the outer wall orifice 43A in a closed position of the BPA member 50.

In the example of FIG. 2, the electrically insulating casing 40 is shown as accommodating the first busbar 10A and the second busbar 10B. The BPA member 50 is in the open position and is held or anchored to the outer wall 40A of the electrically insulating case 40 by the interaction of the edge 46 with the hooks 54, which thus act as an anchor unit. The anchor unit allows to pre-assemble the BPA member 50 to the electrically insulating casing 40 which simplifies storing, handling, and assembling of the insulated connection system of the present disclosure.

In the example of FIG. 3, the electrically insulating casing 40 is shown as accommodating the first busbar 10A and the second busbar 10B. The BPA member 50 is in a closed position, for example with the cylindrical portion 51 in contact with an inner wall of the bar orifice 13B of the second busbar 10B and the inner wall orifice 43B for example on the orifice inner surface. The mid portion 53 may be accommodated in the outer wall orifice 43A, for example in contact or facing the outer wall orifice 43A, and the head portion 52 may be in contact or in abutment with the outer wall 40A of the electrically insulating casing 40.

The BPA member 50 may be locked in the closed position by the insertion of the edge 46 of the outer wall orifice 43A in the grooves 55 of the BPA member 50, which thus act as a locking unit. Preferably, the groove 55 and/or the edge 46 may have squared cross-section or at least a straight angle preventing the edge 46 to escape the groove 55, thus forming a permanent locking unit. Alternatively, or in combination, the BPA member 50 may be glued or welded to the outer wall orifice 43A and/or the inner wall orifice 43B.

The BPA member 50 may also have any configured shape, and for example may include at least the cylindrical portion 51. The BPA member 50 may at least contact the bar orifice 13B and the outer wall 40A and/or the inner wall 40B. The BPA member 50 may at least insulate the first connector 20A from the second busbar 10B.

The elements of the anchor unit and the locking unit may differ from the ones described below. Alternatively, or in combination, they may be located on the head portion 52 and/or on the cylindrical portion 51 of the BPA member 50 and on the outer wall 40A and/or on the inner wall 40B of the electrically insulating casing 40.

In particular, if the inner wall orifice 43B is smaller than the outer wall orifice 43A and/or smaller than the external diameter of the cylindrical portion 51, the BPA member 50 may be in contact with an inner side of the inner wall 40B or may be snap-fitted or interlocked to the inner wall 40B.

Figure 4:
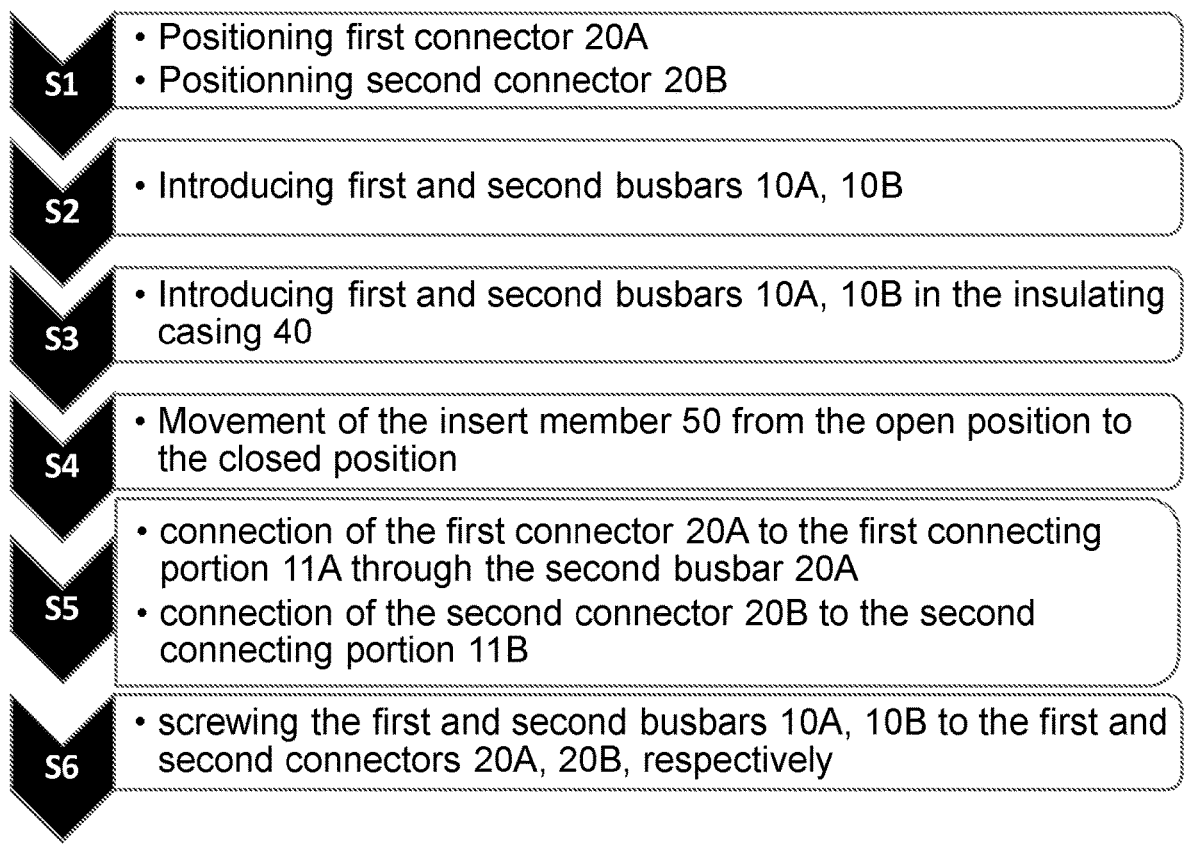
FIG. 4 shows a flow chart of a method of assembling an insulated connection system according to some embodiments.

FIG. 4 illustrates an example of an assembling method of the above-described insulated connection system, according to an embodiment of the present disclosure. In a first step S1, the first connector 20A and the second connector 20B may be positioned in the electrical system to be connected by the insulated connection system, such as inside a battery casing.

In a second step, S2, the first and second busbars 10A, 10B may be introduced inside the battery casing. The first and second busbars 10A, 10B may have been prepared beforehand by removing part of the electrically insulating layer 60 in order to define the respective connecting portions 11A, 11B and/or by generating or drilling the bar orifice 13B in the second busbar 10B.

In a third step S3, the first and second busbars 10A, 10B are introduced in the electrically insulating casing 40, so that the connecting portions 11A, 11B of the first and second busbars 10A, 10B reach the corresponding first recess portion 41A and second recess portion 41B. At this moment, the length of the busbars may be important which may render difficult a perfect positioning, so that the bar orifice 13B may not be perfectly aligned with the outer wall orifice 43A.

In a fourth step S4, the BPA member 50 which may be provided on the electrically insulating casing 40 in the open position visible in FIG. 2, may be moved from the open position to the closed position visible in FIG. 3, for example by a translation movement such as a push toward the first busbar 10A and/or toward the first recess portion 41A. Some movement of the second busbar 10B and/or of the electrically insulating casing 40 may be needed to align the connector passage with the bar orifice 13B to allow the movement of the BPA member 50 from the open position to the closed position.

In the closed position of FIG. 3, an outer wall of the BPA member 50 may be in contact with an inner surface of the outer wall orifice 43A, of the bar orifice 13B and/or of the inner wall orifice 43B. In addition, the BPA member 50 may be locked by the engagement of the locking unit, as previously described. Consequently, the BPA member 50 may not be easily disengaged from the closed position and from the bar orifice 13B.

In the closed position, the BPA member 50 may further lock the electrically insulating casing 40 to the second busbar 10B, thus preventing the electrically insulating casing 40 from moving with regard to the second busbar 10B, which may contribute to simplifying assembly of the insulated connection system of the present disclosure.

In a fifth step S5, the connectors may then be assembled, with the first connector 20A inserted through the BPA member 50 and the first connection orifice 45A of the first recess portion 41A in order to contact the first connecting portion 11A of the first busbar 10A. The second connector 20B may be introduced through the second connection orifice 45B of the second recess portion 41B in order to contact the second connecting portion 11B of the second busbar 10B.

The electrically insulating casing 40 may be moved in a position above the connectors 20A, 20B, assuming the connectors 20A, 20B are in a vertical position, and moved or translated down toward the connectors 20A, 20B, for the connectors 20A, 20B to be accommodated in the electrically insulating casing 40, as discussed above.

In a sixth step S6, the screws 30A, 30B may be introduced in the screw orifices 44A, 44B of the first recess portion 41A and of the second recess portion 41B and in the fixing through holes 12A, 12B of the first busbar 10A and the second busbar 10B, in order to fix the first and second connectors 20A, 20B to the first and second busbars 10A, 10B, respectively. Alternatively, or in combination, any other fixing method may be performed, in order to fix each busbar with the respective connector.

In step S1 or in step S6, the other extremities of the first and second connector 20A, 20B may be fixed or connected to electrical elements, for example to battery modules or to a charging circuit. For example, the first step S1 may be performed at another moment of the assembling method of FIG. 4, for example after step S3 or after step S4. Alternatively, the first step S1 may be performed during an earlier or previous assembling process of the battery or electrical system.

The sealing interface 70 may be positioned on the busbars 10A, 10B, for example before step S1 and fixed to the battery casing after step S5 or step S6.

Thanks to the specific arrangement of the electrically insulating casing, the insulated connection system may be small and easy to assemble even in a tight space. The BPA member 50 may act as an alignment guide and/or a lock during the assembling method and then as an electrical insulator during use of the insulated connection system of the present disclosure.

The electrically insulating casing 40 may be manufactured from any insulating material, preferably a polymer or composite material, for example Polyamide 6 or Polyamide 6,6. The wall thickness of the electrically insulating casing 40 may be 0.8 to 2.0 mm, preferably 1.0 to 1.5 mm. The BPA member 50 may be of the same material and/or of the same thickness.

The electrically insulating casing 40 and the BPA member 50 may be produced using any manufacturing method known by the skilled person, such as injection molding, injection blowing or 3D printing.

The distance, on a longitudinal axis of the busbars 20A, 20B, between the first connection orifice 45A of the first recess portion 41A and the second connection orifice 45B of the second recess portion 41B may be configured to the specific current intended to for the present insulated connection system. For example, the distance may be 10 to 50 mm, preferably 15 to 45 mm, 22 to 39 mm, 28 to 36 mm and preferably around 30 mm. This distance may correspond to the distance in between the connectors 20A, 20B.

The busbars and/or the connectors may be made of any electrical conducting material, for example a metal such as aluminum or copper. Their shape and arrangement may be configured to the specific application of the present insulated connection system, for example the specific current, the specific electric system and the specific space in which the insulated connection system is accommodated.

While this invention has been described in terms of the preferred embodiments thereof, it is not intended to be so limited, but rather only to the extent set forth in the claims that follow. For example, the above-described embodiments (and/or aspects thereof) may be used in combination with each other. In addition, many modifications may be made to configure a particular situation or material to the teachings of the invention without departing from its scope. Dimensions, types of materials, orientations of the various components, and the number and positions of the various components described herein are intended to define parameters of certain embodiments and are by no means limiting and are merely prototypical embodiments.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any order of arrangement, order of operations, direction or orientation unless stated otherwise.

The invention claimed is:

1. An insulated connection system for connecting at least a first busbar and a second busbar to at least a first connector and a second connector, the second busbar including a bar orifice to connect the first connector to the first busbar through the second busbar, the insulated connection system comprising:

an electrically insulating casing having a first recess portion for accommodating a first connecting portion of the first busbar, the first recess portion defining a first connection orifice for connecting the first connecting portion to the first connector, a second recess portion for accommodating a second connecting portion of the second busbar; the second recess portion defining a second connection orifice for connecting the second connecting portion to the second connector, and a sleeve portion for accommodating a portion of the second busbar provided with the bar orifice, the sleeve portion defining a connector passage configured to allow the passage of the first connector through the sleeve portion; and a busbar positioning assurance (BPA) member having a hollow body of electrically insulating material configured to accommodate a portion of the first connector and being further configured to be received in the connector passage and the bar orifice when the bar orifice is aligned with the connector passage.

2. The insulated connection system according to claim 1, wherein the BPA member is received in the connector passage in a closed position and wherein the insulated connection system further includes an anchor unit to anchor the BPA member to the electrically insulating casing in an open position in which the BPA member is not received in the connector passage.

3. The insulated connection system according to claim 2, wherein the anchor unit includes at least one edge provided on one of the connector passage and the BPA member and at least one hook provided on the other of the connector passage and the BPA member, the edge and the hook being engaged in the open position of the BPA member.

4. The insulated connection system according to claim 1, including a locking unit to lock the BPA member to the electrically insulating casing when the BPA member is received in the connector passage.

5. The insulated connection system according to claim 4, wherein the locking unit includes at least one edge provided on one of the connector passage and the BPA member and at least one groove provided on the other of the connector passage and the BPA member, the edge and the groove being engaged when the BPA member is received in the connector passage.

6. The insulated connection system according to claim 1, wherein the BPA member is configured to be in contact with the second busbar and the electrically insulating casing when the BPA member is received in the connector passage.

7. The insulated connection system according to claim 1, wherein the first connection orifice and the second connection orifice each define an orifice axis parallel to each other.

8. The insulated connection system according to claim 1, wherein the first recess portion and the second recess portion each define a recess longitudinal axis parallel to each other.

9. The insulated connection system according to claim 8, wherein the first connection orifice and the second connection orifice each define an orifice axis parallel to each other and wherein the orifice axis is perpendicular to the recess longitudinal axis.

10. The insulated connection system according to claim 9, wherein the connector passage is aligned with the orifice axis of the first connection orifice.

11. The insulated connection system according to claim 1, wherein the sleeve portion is defined by a portion of an outer wall and an inner wall of the electrically insulating casing.

12. The insulated connection system according to claim 11, wherein the connector passage includes an outer wall orifice defined in the portion of the outer wall and an inner wall orifice defined in the inner wall.

13. A battery comprising the insulated connection system according to claim 1.

14. A vehicle comprising the battery according to claim 13.

* * * * *

UNITED STATES PATENT AND TRADEMARK OFFICE
CERTIFICATE OF CORRECTION

Page 1 of 1

PATENT NO.         : 12,126,128 B2
APPLICATION NO.    : 17/856152
DATED              : October 22, 2024
INVENTOR(S)        : Mélanie Guillanton and Jean Fabre It is certified that error appears in the above-identified patent and that said Letters Patent is hereby corrected as shown below:

On the Title Page

(71) Applicant should read "Aptiv Technologies AG, Schaffhausen (CH)".

Signed and Sealed this
Twenty-eighth Day of January, 2025

Coke Morgan Stewart
*Acting Director of the United States Patent and Trademark Office*